(12) United States Patent
Owens et al.

(10) Patent No.: US 7,597,984 B2
(45) Date of Patent: Oct. 6, 2009

(54) FUEL CELL BIPOLAR PLATES WITH MULTIPLE ACTIVE AREAS SEPARATED BY NON-CONDUCTIVE FRAME HEADER

(75) Inventors: John N. Owens, Royal Oak, MI (US); Daniel Lisi, Eastpointe, MI (US)

(73) Assignee: GM Global Technology Operations, Inc.

( * ) Notice: Subject to any disclaimer, the term of this patent is extended or adjusted under 35 U.S.C. 154(b) by 924 days.

(21) Appl. No.: 11/041,664

(22) Filed: Jan. 24, 2005

(65) Prior Publication Data

US 2006/0163771 A1    Jul. 27, 2006

(51) Int. Cl.
*H01M 2/14*    (2006.01)
*H01M 2/08*    (2006.01)
*H01M 2/00*    (2006.01)
*A61M 25/00*   (2006.01)

(52) U.S. Cl. .............................. 429/34; 429/35; 429/38; 429/36; 264/250

(58) Field of Classification Search .................... 429/34, 429/38, 44
See application file for complete search history.

(56) References Cited

U.S. PATENT DOCUMENTS

2003/0152821 A1* 8/2003 Lisi et al. ...................... 429/34
2004/0175608 A1* 9/2004 Lisi et al. ...................... 429/38
2005/0100771 A1* 5/2005 Vyas et al. ..................... 429/32

OTHER PUBLICATIONS

BulkMolding Compounds, "Conductive BMC," http://www.bulkmolding.com/products/conductivebmc/conductivebmc1.html.
BulkMolding Compounds, "Conductive BMC," http://www.bulkmolding.com/products/conductivebmc/conductivebmc1.html, Apr. 17, 2003.

\* cited by examiner

*Primary Examiner*—Dah-Wei D Yuan
*Assistant Examiner*—Maria J Laios
(74) *Attorney, Agent, or Firm*—Harness, Dickey & Pierce, P.L.C.

(57) ABSTRACT

A method of making a bipolar plate includes molding a non-conductive housing defining a plurality of receiving areas. A first plurality of conductive charges are located into each of the plurality of receiving areas. Compressive force is applied to each of the first plurality of conductive charges thereby defining a first plurality of conductive plates bonded on outer edges to the non-conductive housing. A second plurality of conductive plates are located onto the first series of conducive plates. The first and second plurality of conductive plates are bonded together defining a coolant flow field therebetween.

28 Claims, 6 Drawing Sheets

FUEL CELL BIPOLAR PLATES WITH MULTIPLE ACTIVE AREAS SEPARATED BY NON-CONDUCTIVE FRAME HEADER

FIELD OF THE INVENTION

The present invention relates to PEM fuel cells and more particularly to a method of making a bipolar plate for use within a fuel cell stack.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. As such these MEAs are relatively expensive to manufacture and require certain conditions, including proper water management and humidification and control of catalyst fouling constituents such as carbon monoxide (CO), for effective operation.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

In general, it is desirable to provide a fuel cell stack having high voltage. One way to provide high voltage is to implement several fuel cell stacks electrically connected in series. The cost associated with handling and assembling a large volume of fuel cells for automotive applications is cost prohibitive. In addition to providing high voltage, packaging constraints within a vehicle require a fuel cell stack to occupy a reduced area. As a result, it is desirable to provide a high-voltage fuel cell stack while satisfying related packaging constraints.

SUMMARY OF THE INVENTION

A method of making a bipolar plate includes molding a non-conductive housing defining a plurality of receiving areas. A first plurality of conductive charges are located into each of the plurality of receiving areas. Compressive force is applied to each of the first plurality of conductive charges thereby defining a first plurality of conductive plates bonded on outer edges to the non-conductive housing. A second plurality of conductive plates are located onto the first series of conducive plates. The first and second plurality of conductive plates are bonded together defining a coolant flow field therebetween.

According to other features compressive force is applied to a second plurality of conductive charges thereby defining the second plurality of conductive plates. Applying compressive force to each of the first plurality of conductive charges includes defining first reactant flow fields on respective first plurality of conductive plates. Applying compressive force to a second plurality of conductive charges includes defining second reactant flow fields on respective second plurality of conductive plates. Bonding the first and second plurality of conductive plates together includes applying adhesive onto contact surfaces defined between the first and second plurality of conductive plates. Compressive force is applied onto the first and second plurality of conductive plates thereby thermally activating the adhesive and forming a bond at the contact surfaces.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
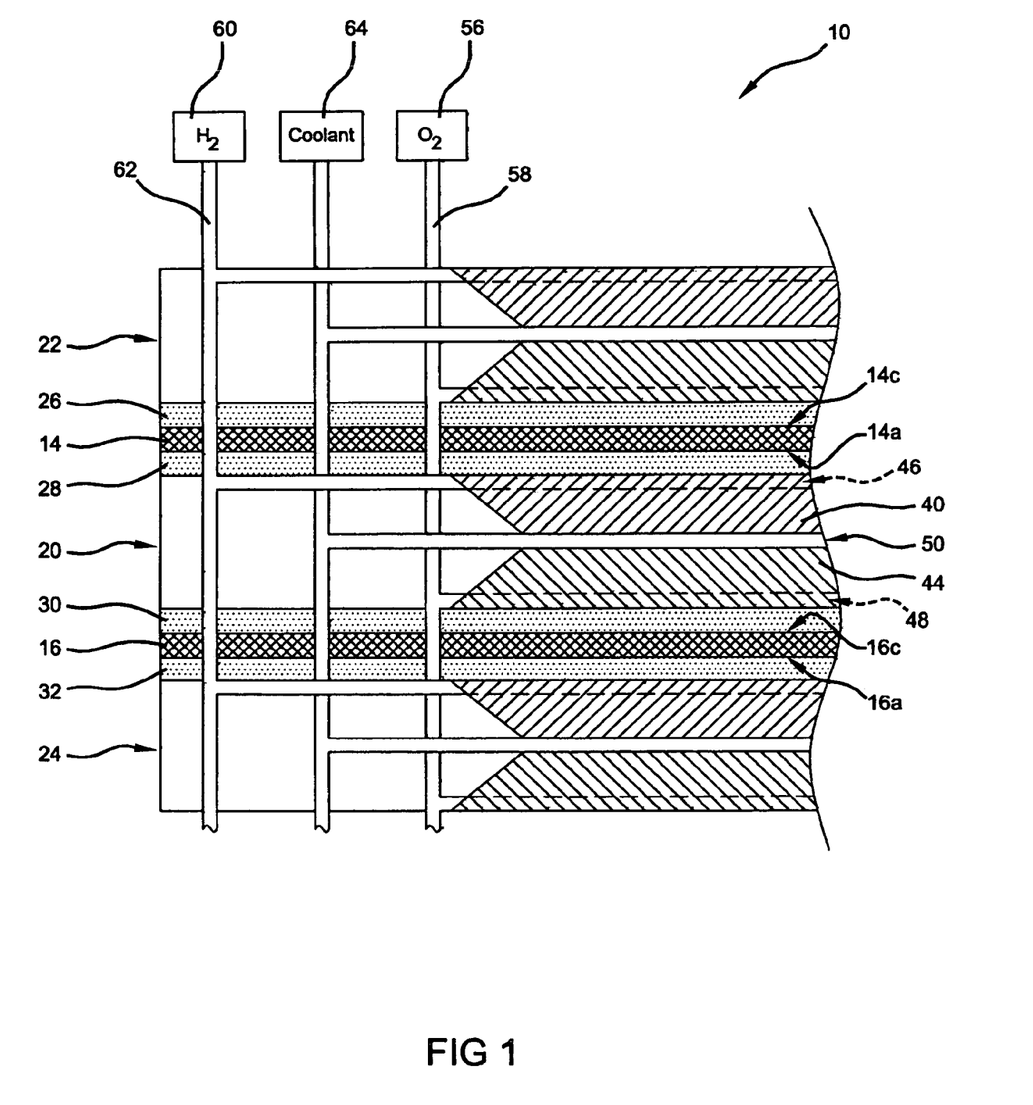
FIG. 1 is a partial sectional view of a fuel cell stack according to the present teachings.

FIG. 1 schematically depicts a partial PEM fuel cell stack 10 having membrane-electrode-assemblies (MEAs) 14, 16 separated from each other by a non-porous, electrically-conductive bipolar plate assembly 20. The MEAs 14 and 16 and bipolar plate assembly 20 are stacked together between non-porous, electrically-conductive, bipolar plate assemblies 22 and 24. Porous, gas permeable, electrically conductive sheets or diffusion media 26, 28, 30 and 32 press up against the electrode faces of the MEAs 14 and 16 and may serve as primary current collectors for the electrodes. The diffusion media 26, 28, 30 and 32 also provide mechanical supports for the MEAs 14 and 16, especially at locations where the MEAs are otherwise unsupported in the flow field. Suitable diffusion media include carbon/graphite paper/cloth, fine mesh noble metal screens, open cell noble metal foams, and the like which conduct current from the electrodes while allowing gas to pass therethrough.

The bipolar plate assemblies 22 and 24 press up against the primary current collector 26 on the cathode face 14c of the MEA 14 and the primary current collector 32 on the anode face 16a of the MEA 16. The bipolar plate assembly 20 presses up against the primary current collector 28 on the anode face 14a of the MEA 14 and against the primary current collector 30 on the cathode face 16c of the MEA 16.

With continued reference to FIG. 1 and further reference to FIGS. 2 and 6, the bipolar plate assembly 20 will be described. The bipolar plate assembly 20 generally includes a series of distinct anode plates 40 and cathode plates 44 (FIG. 6) as will be described more fully below. An anode flow field 46 (FIGS. 1 and 2) is defined across each of the anode plates 40 of the bipolar plate assembly 20, a cathode flow field 48 (FIG. 1) is defined across each of the cathode plates 44 of the bipolar plate assembly 20, and a coolant flow field 50 is defined between the anode and cathode plates 40, 44. An oxidant gas such as oxygen or air is supplied to the cathode side of the fuel cell stack 10 from a storage tank 56 via appropriate supply plumbing 58. Similarly, a fuel such as hydrogen is supplied to the anode side of the fuel cell stack 10 from a storage tank 60 via appropriate plumbing 62. Coolant is supplied between adjacent anode and cathode plates 40 and 44 from a coolant tank 64.

In a preferred embodiment, the oxygen tank 56 may be eliminated, and air supplied to the cathode side from the ambient. Likewise, the hydrogen tank 60 may be eliminated and hydrogen supplied to the anode side from a reformer which catalytically generates hydrogen from methanol or a liquid hydrocarbon (e.g., gasoline). Exhaust plumbing (not specifically shown) for the $H_2$ and $O_2$ air sides of the MEAs is also provided for removing $H_2$ depleted anode gas from the respective anode flow field 46 and $O_2$ depleted cathode gas from the respective cathode flow fields 48.

Figure 2:
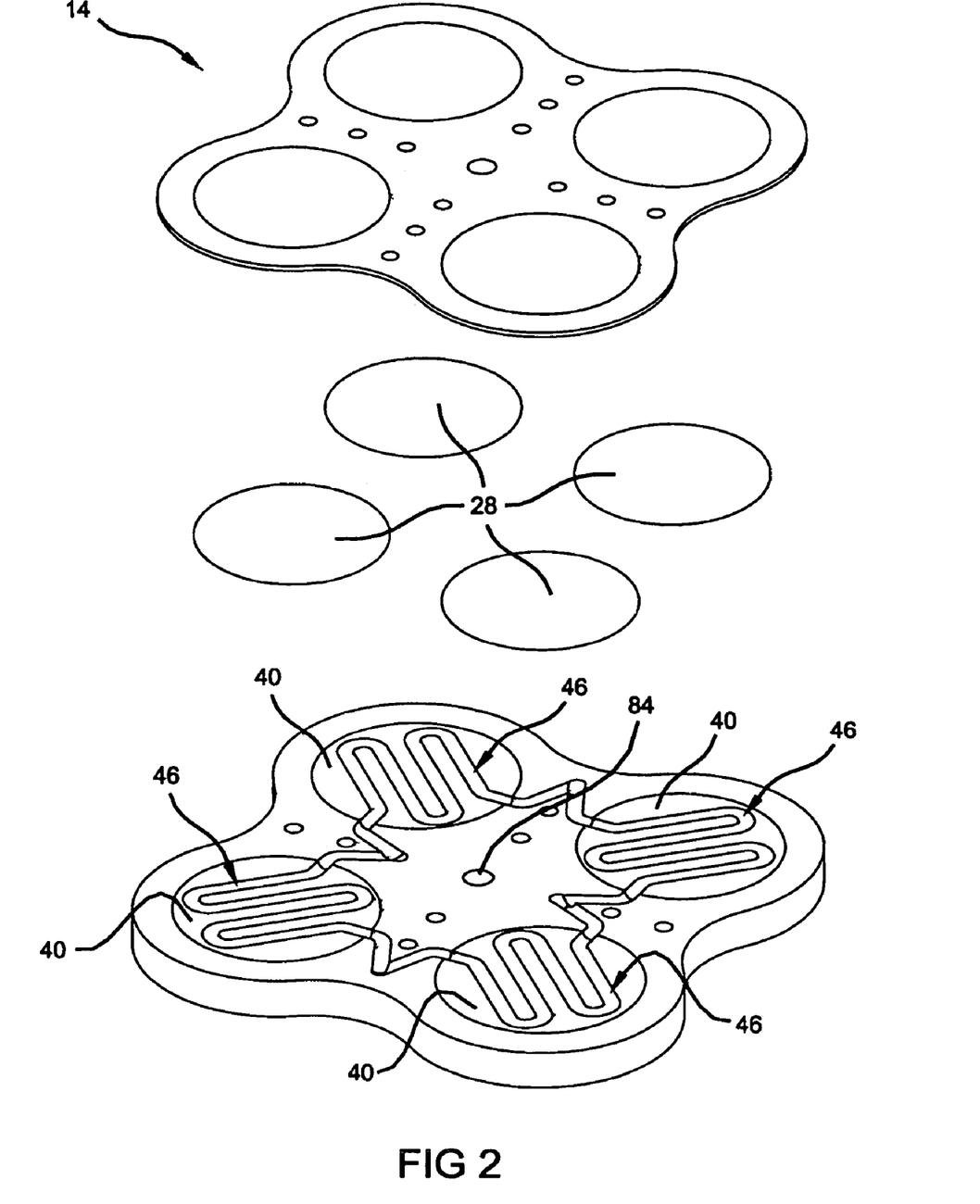
FIG. 2 is a partial exploded view of the fuel cell stack of FIG. 1.
Figure 3:
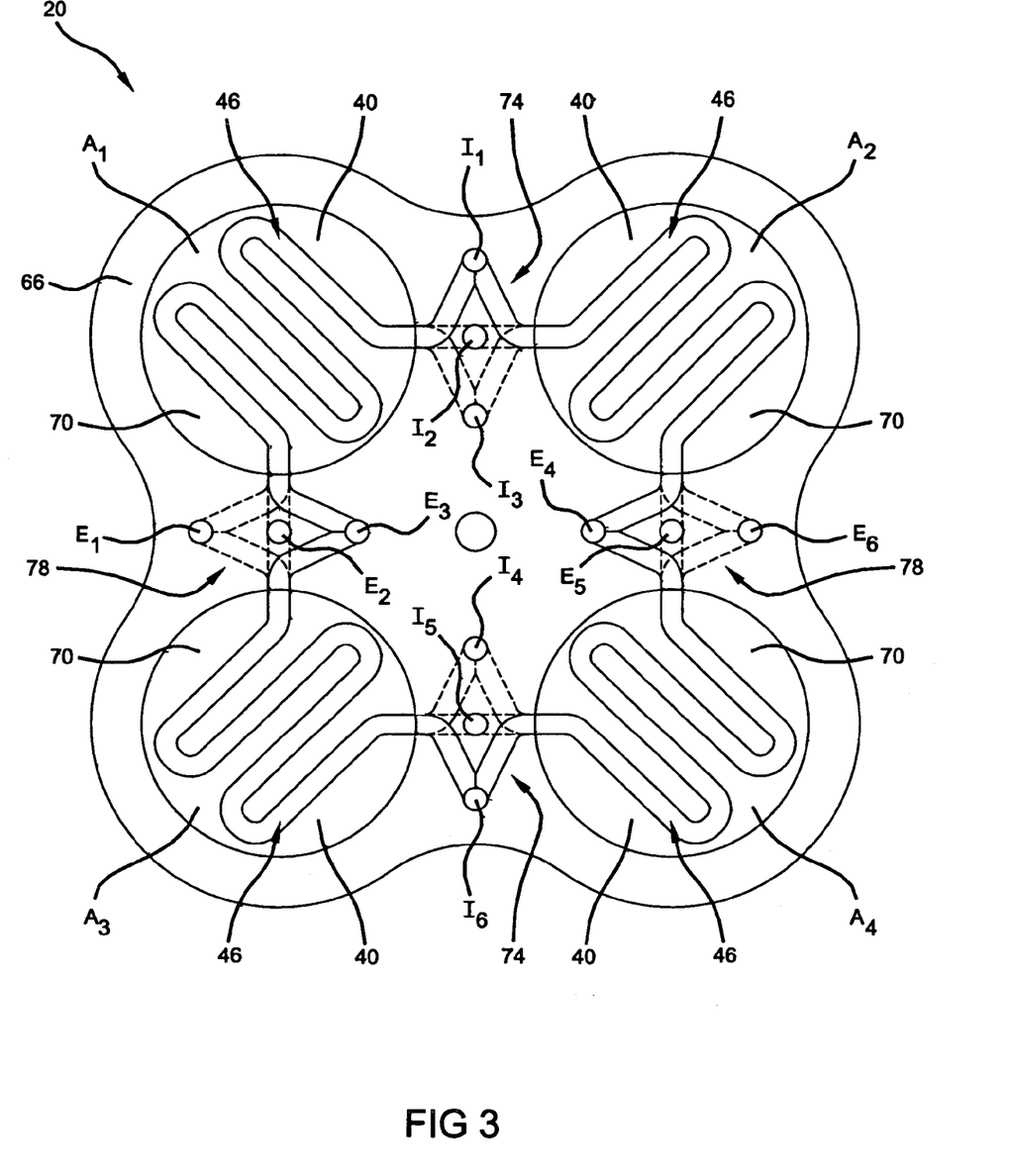
FIG. 3 is a plan view of a bipolar plate assembly according to the present teachings.

With specific reference now to FIGS. 1-3, the porting of the respective reactants in the fuel cell stack 10 will be further described. FIG. 3 illustrates a top view of the bipolar plate assembly 20 (anode side faced up). As will be described in further detail below, the bipolar plate assembly 20 generally includes the first plurality of anode plates 40, a complementary series of cathode plates 44 (disposed under the anode plates as viewed from FIG. 3) and a non-conductive housing 66. The anode and cathode plates 40 and 44 respectively, form a plurality (four as illustrated in FIG. 2) of individual bipolar plates 70 that are electrically insulated laterally from each other by the nonconductive housing 66. In addition, the anode and cathode plates 40 and 44 are electrically connected in series within the fuel cell stack 10 to provide a high output voltage in reduced space. While the respective anode and cathode plates 40 and 44 respectively are shown as circular, it is appreciated that the geometry is merely exemplary and other shapes may similarly be employed such as, but not limited to rectangle. Additionally, the respective flow fields 44, 46 and 50 are merely exemplary and may comprise other flow patterns. Likewise, while the housing 66 takes on a generally clover-like shape to accommodate the circular anode and cathode plates 40 and 44, other suitable shapes may similarly be employed to contain the respective anode and cathode plates 40 and 44 comprising the bipolar plates 70.

The bipolar plate assembly 20 generally includes an intake header 74 arranged vertically through the middle of the bipolar plate assembly 20 and an exhaust header 78 arranged horizontally through the middle of the bipolar plate assembly 20. The intake header 74 generally defines a series of inlet apertures $I_1$-$I_6$. Similarly, the exhaust header generally defines a series of exhaust apertures $E_1$-$E_6$. In one implementation, the inlet apertures $I_1$ and $I_6$ cooperate to deliver a first reactant gas (e.g. $H_2$) to anode plates $A_1$, $A_2$ and $A_3$, $A_4$ respectively. During operation, once the first reactant gas flows across the respective anode flow fields 46, it is exhausted by way of exhaust apertures $E_3$ and $E_4$. The remaining inlet apertures and exhaust apertures are utilized to deliver the second reactant gas (e.g. $O_2$) and the coolant respectively. In the exemplary configuration shown, the inlet apertures $I_2$ and $I_5$ cooperate to deliver the second reactant gas (e.g. $H_2$) to respective cathode flow fields 48 along the cathode plates 44 (while not specifically illustrated in FIG. 2, the cathode plates 44 are operatively positioned under each of the anode plates 40).

During operation, once the second reactant gas flows across the respective cathode flow fields 48, it is exhausted by way of exhaust apertures $E_2$ and $E_5$. Finally, the inlet apertures $I_3$ and $I_4$ cooperate to deliver a coolant to the respective coolant flow fields 50 defined between the anode and cathode plates 40 and 44. The coolant is exhausted by way of exhaust apertures $E_1$ and $E_6$. It is appreciated that while the respective inlet and exhaust apertures $I_{1-6}$ and $E_{1-6}$ have been specifically assigned to communicate a given fluid, the apertures are interchangeable and may be configured to deliver a given fluid as desired. It will become apparent that such configurations are defined according to the porting configuration provided by the non-conductive housing 66. Moreover, while a single inlet and outlet aperture is described as supplying a pair of flow fields, other configurations may be similarly employed.

Figure 4:
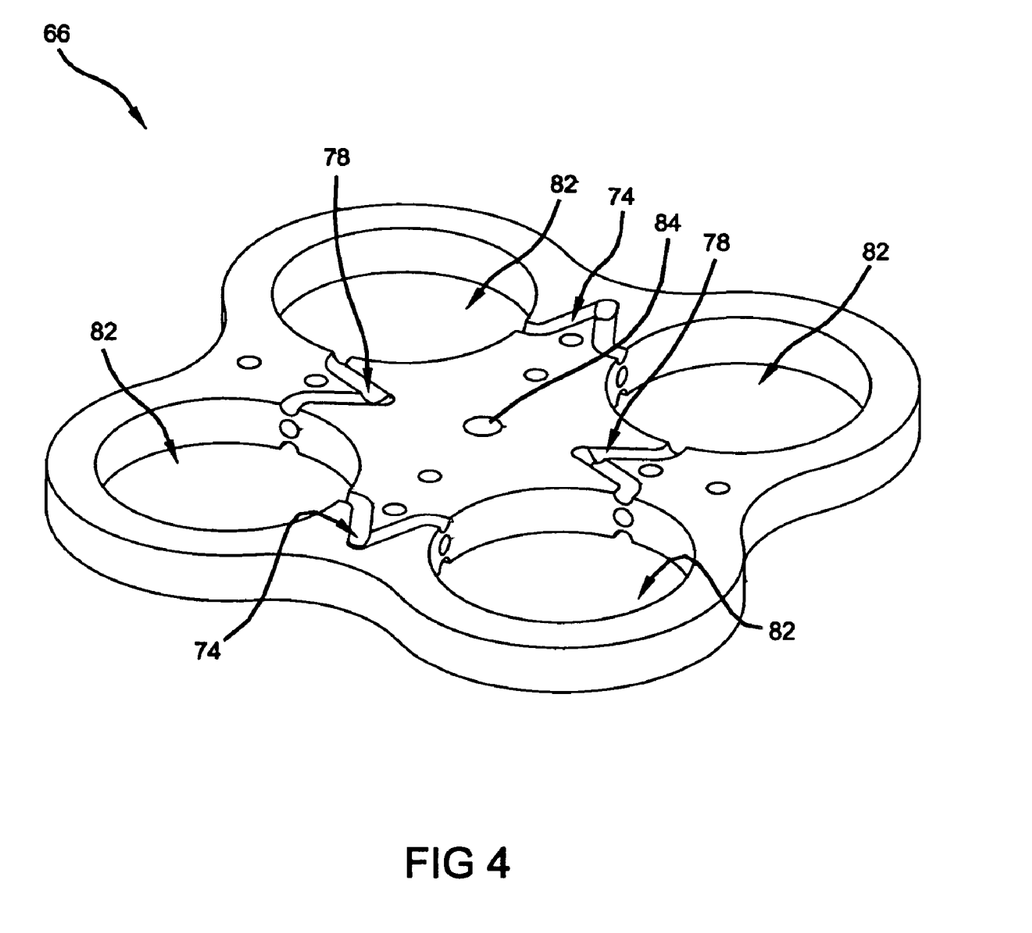
FIG. 4 is a perspective view of a non-conductive housing employed for constructing the bipolar plate assembly of FIG. 3.

With particular reference now to FIGS. 3-6, a method of making a bipolar plate according to the present teachings will be described. At the outset, a housing 66 (FIG. 4) is formed from a suitable non-conductive, insulating material. The housing 66 may be formed by any suitable process, such as injection molding for example. As shown in FIG. 4, the housing 66 defines a plurality of receiving portions 82. Similarly, the necessary porting is defined in the housing 66 to communicate appropriate fluids from the intake header 74, across respective flow fields 46, 48 and 50, and out the exhaust header 78. In addition to the porting, necessary gaskets and seals may be molded into the non-conductive housing 66 (not specifically shown). A central bore 84 is arranged for accommodating an alignment rod (not shown) during the molding process.

Figure 5:
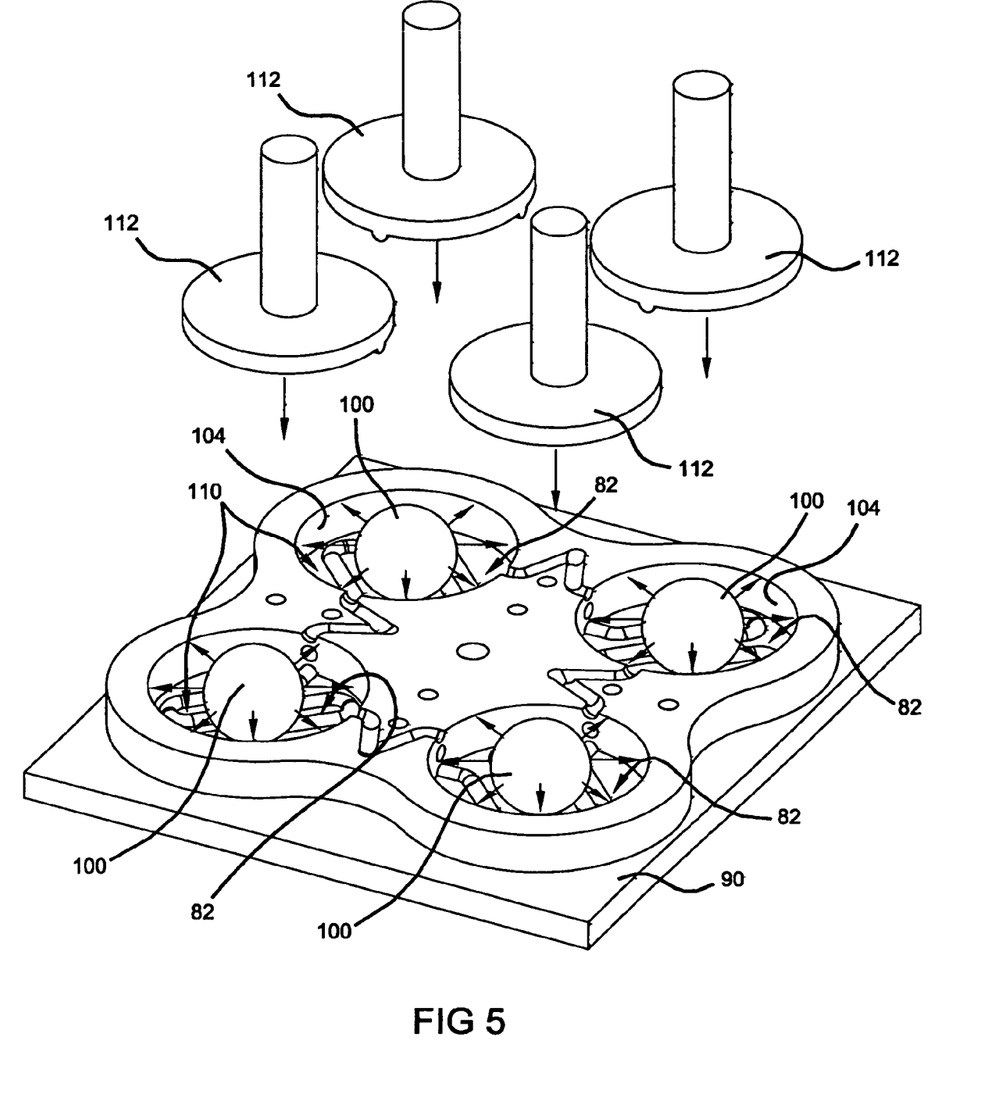
FIG. 5 is a perspective view of a mold process used to form a first plurality of conductive plates in the non-conductive housing of FIG. 4.

Next, the non-conductive housing 66 is placed into a compression mold 90 (FIG. 5). A plurality of conductive charges 100 are located into respective receiving areas. The conductive charges 100 define a molding compound and may take the form of spheres or disks for example. The conductive charges 100 comprise any suitable material having favorable bipolar plate properties. One suitable material is BMC 940 manufactured by Bulk Molding Compounds, Inc. Once the charges 100 are placed into the respective receiving areas 82, a compressive force is applied to the conductive charges 100. As a result, the respective conductive charges 100 are driven toward the respective inner diameters 104 of the receiving areas 82 defined in the housing 66. Concurrently, the desired flow fields 48 and 50 (FIG. 1), having associated lands and channels, is defined on opposite faces of the newly formed plates. The pattern of the flow fields are defined by die portions 110 and 112 of the mold 90. Furthermore, the compression mold 90 is arranged to align appropriate inlets and outlets of the flow fields 48 and 50 on the respective plates 44 with appropriate porting. $I_{1-6}$ and $E_{1-6}$. While the plates shown are cathode plates 44, it is appreciated that the anode plates 40 may alternatively be formed in this step. The compression molding process creates an integral chemical seal at an interface between the housing 66 and the cathode plates 44 (at the receiving area inside diameter 104) (FIG. 5).

Figure 6:
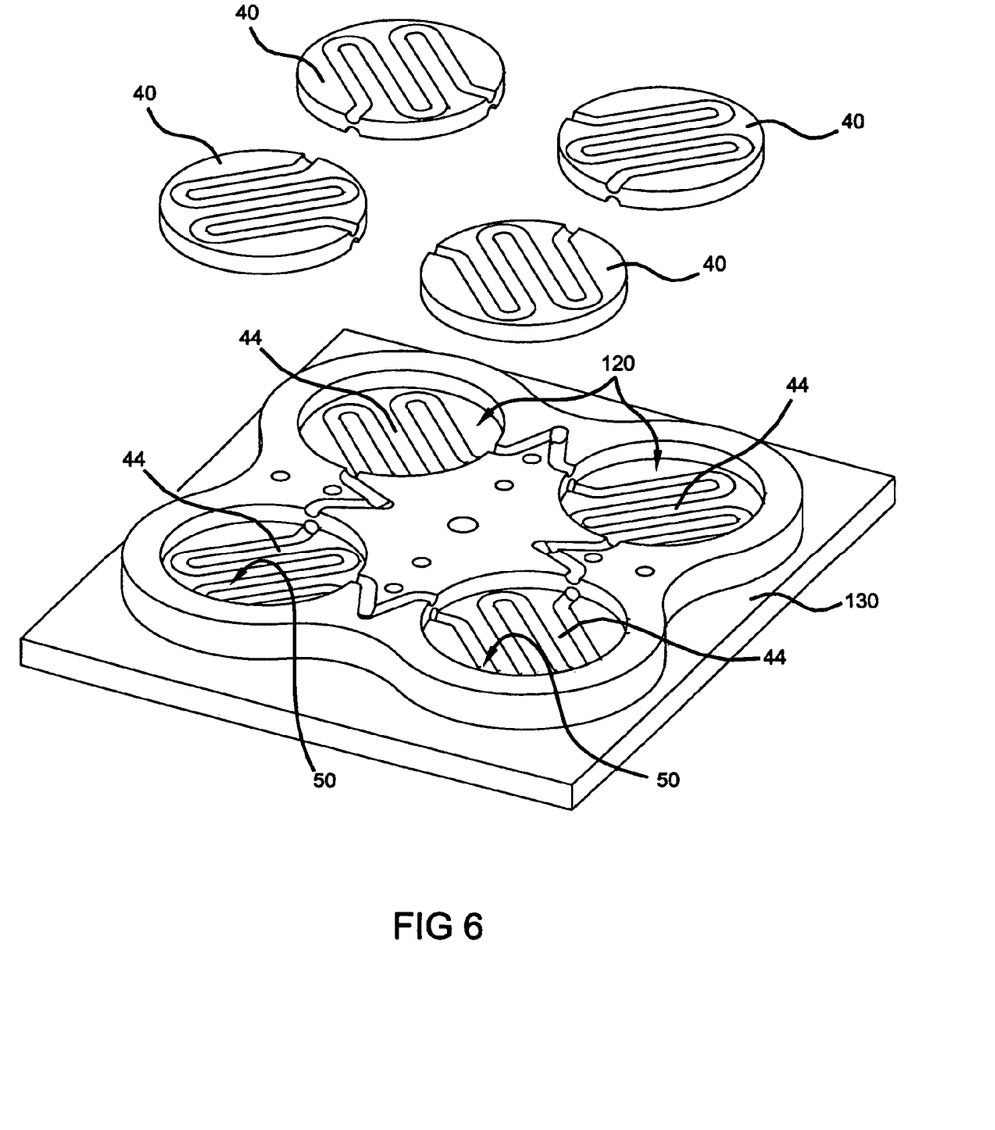
FIG. 6 is a perspective view of a second plurality of conductive plates being attached to the first plurality of conductive plates.

Turning now to FIG. 6, the cathode plates 44 are shown after the molding process of FIG. 5. At this point, a thermally activated, conductive adhesive 120 is applied to the upper face of each cathode plate 44. Next, a complementary plurality of anode plates 40 are located onto the cathode plate 44. The anode plates 40 may be formed as standalone pieces in a complementary compression mold as a preliminary step. Next, the assembly is placed into a press 130 suitable to hold the anode plates 40 against the cathode plates 44 while exposing the assembly to necessary levels of heat to activate the adhesive bond (facilitated by the adhesive 120) between the anode and cathode plates 40 and 44. It is noted that the coolant flow field 50 is defined collectively by the flow on the upper face of cathode plates 44 and lower face of anode plates 40. As a result, proper alignment must be maintained while placing the anode plates 40 atop the cathode plates 44 in this step. It is contemplated that while not specifically shown, that the anode plates 40 may have keys extending from a perimeter for locating into a groove defined on the inside diameter's 104. Alternatively, as mentioned previously, the anode plates 40 (and cathode plates 44) may define other geometric shapes, such as rectangular, to facilitate proper alignment. In general, the adhesive bond encourages land to land contact between opposing anode and cathode plates 40 and 44 facilitating electrical conduction. This completes construction of the bipolar plate assembly 20.

Preferably a series of bipolar plate assemblies 20 are made according to the above method. Next, the fuel cell stack 10 is completed by incorporating respective MEAs 14 and 16 and diffusion media 26, 28, 30 and 32 between adjacent bipolar plate assemblies 20 as illustrated in FIG. 1A.

Those skilled in the art can now appreciate from the foregoing description that the broad teachings of the present invention can be implemented in a variety of forms. For example, while the necessary gaskets and seals have been described herein as molded concurrently with the non-conductive housing, the gaskets and seals may be incorporated in a supplemental molding step. In addition, the porting defined on the intake header 74 and the exhaust header 78, including the respective anode, cathode, and coolant pathways defined through the housing 66, is exemplary and other arrangements may be employed, such as through the molding process. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of making a bipolar plate comprising:
   molding a non-conductive housing defining a plurality of receiving areas:
   locating a first plurality of conductive charges into each of said plurality of receiving areas, said housing including an intake header and an exhaust header that connect a plurality of inlet and outlet apertures to the respective plurality of receiving areas;
   applying compressive force to each of said first plurality of conductive charges thereby defining a first plurality of conductive plates bonded on outer edges to said non-conductive housing, each late of said first plurality of conductive plates having a first reactant flow field that fluidly communicates with said intake and exhaust headers;
   locating a second plurality of conductive plates onto said first series of conductive plates, each plate of said second plurality of conductive plates having a second reactant flow field that fluidly communicates with said intake and exhaust headers; and
   bonding said first and second plurality of conductive plates together defining a coolant flow field therebetween.

2. The method of making a fuel cell of claim 1, further comprising:
   applying compressive force to a second plurality of conductive charges thereby defining said second plurality of conductive plates.

3. The method of claim 2 wherein applying compressive force to said second plurality of conductive charges includes defining each of said second reactant flow fields on respective second plurality of conductive plates.

4. The method of claim 1 wherein bonding said first and second plurality of conductive plates together comprises:
   applying adhesive onto contact surfaces defined between said first and second plurality of conductive plates; and
   applying compressive force onto said first and second plurality of conductive plates thereby thermally activating said adhesive and forming a bond at said contact surfaces.

5. The method of claim 4 wherein bonding said first and second plurality of conductive plates together further comprises, adhesively bonding outer edges of said second plurality of conductive plates to said non-conductive housing.

6. The method of claim 5 wherein adhesively bonding outer edges of said second plurality of conductive plates to said non-conductive housing includes defining a groove between said plurality of conductive plates and said non-conductive housing, said groove adapted to provide coolant to said coolant flow field.

7. The method of claim 1 wherein molding a non-conductive housing further comprises, defining at least one inlet and outlet passage for each of a first reactant, a second reactant and a coolant.

8. The method of claim 2 wherein said first and second plurality of conductive charges comprise graphite composite material.

9. A method of making a bipolar plate comprising:
   providing a non-conductive housing that defines a plurality of receiving areas and has an intake header and exhaust header that both connect to the respective plurality of receiving area;
   locating a first plurality of conductive charges into a corresponding plurality of said receiving areas of said non-conductive housing;

applying compressive force to each of said first plurality of conductive charges thereby defining a first plurality of conductive plates bonded on outer edges to said non-conductive housing, each plate of said first plurality of conductive plates having a first reactant flow field that fluidly communicates with said intake and exhaust headers; and attaching a second plurality of conductive plates into contact with said first series of conductive plates.

10. The method of claim 9 wherein applying compressive force to each of said first plurality of conductive charges includes defining each of said first reactant flow fields on respective first plurality of conductive plates.

11. The method of claim 9, further comprising applying compressive force to a second plurality of conductive charges to define second reactant flow fields on respective second plurality of conductive plates.

12. The method of claim 9 wherein attaching said first and second plurality of conductive plates together comprises:
applying adhesive onto contact surfaces defined between said first and second plurality of conductive plates; and
applying compressive force onto said first and second plurality of conductive plates thereby thermally activating said adhesive and forming a bond at said contact surfaces.

13. The method of claim 1, further comprising molding a non-conductive housing defining at least one inlet and outlet passage for each of a first reactant, a second reactant and a coolant.

14. The method of claim 11 wherein said first and second plurality of conductive charges comprise graphite composite material.

15. A method of making a bipolar plate comprising:
locating a molding compound into at least two receiving areas of a non-conductive frame, said non-conductive frame having a plurality of fluid passages formed therein;
applying compressive force to said molding compound thereby defining at least two conductive plates bonded on outer edges to said non-conductive frame, each of said two conductive plates having a first reactant flow field that is fluidly connected to at least one of said fluid passages of said non-conductive frame; and
attaching complementary conductive plates onto said at least tow conductive plates.

16. The method of claim 15 wherein attaching complementary conductive plates comprises:
applying adhesive onto contact surfaces defined between said at least two conductive plates and said complementary conductive plates; and
applying compressive force onto said at least two conductive plates and said complementary conductive plates thereby thermally activating said adhesive and forming a bond at said contact surfaces.

17. The method of claim 15, further comprising molding a non-conductive housing defining said at least two receiving areas and at least one inlet and outlet passages for each of a first reactant, a second reactant and a coolant.

18. The method of claim 15 wherein said at least two conductive plates and said complementary conductive plates comprise graphite composite material.

19. The method of claim 1 wherein bonding said first and second plurality of conductive plates together includes forming a first portion of said coolant flow field by said first series of conductive plates and a second portion of said coolant flow field by said second plurality of conductive plates.

20. The method of claim 1 wherein bonding said first and second plurality of conductive plates includes forming said coolant flow field that is partially defined by a first channel within an upper face of said first plurality of conductive plates and partially defined by a second channel within a lower face of said second plurality of conductive plates.

21. The method of claim 1 wherein locating said second plurality of conductive plates onto said first series of conductive plates includes locating said first and second conductive plates into contact.

22. The method of claim 1 wherein locating said second plurality of conductive plates onto said first series of conductive plates includes locating said first and second plurality of conductive charges into a position where they are seated within a cavity formed within said housing.

23. The method of claim 1 wherein said first and second plurality of conductive plates are disk shaped.

24. The method of claim 9 wherein attaching a second plurality of conductive plates into contact with said first series of conductive plates includes forming said coolant flow field that is partially defined by said first plurality of conductive plates and partially defined by said second plurality of conductive plates.

25. The method of claim 9 wherein attaching a second plurality of conductive plates into contact with said first series of conductive plates includes partially defining a coolant flow field partially within an upper face of said first plates and partially within a lower face of said second plurality of conductive plates.

26. The method of claim 9 wherein said first and second plurality of conductive plates are disk shaped.

27. The method of claim 15 wherein applying compressive force to said molding compound defines two distinct cathode plates that are positioned within said non-conductive frame, wherein a face of each of said two distinct cathode plates is seated flush with a face of said non-conductive housing.

28. The method of claim 15 wherein applying compressive force to said molding compound defines four distinct conductive plates that are positioned within said non-conductive frame and fluidly connected through said non-conductive frame, said non-conductive frame adapted to insulate said four conductive plates from one another.

* * * * *